United States Patent [19]
Pratt

[11] 3,800,231
[45] Mar. 26, 1974

[54] DOPPLER TRACKER RECEIVER

[76] Inventor: John Harry Pratt, 1527 Tigertail Rd., Los Angeles, Calif. 90049

[22] Filed: Mar. 15, 1973

[21] Appl. No.: 341,695

[52] U.S. Cl. ............................... 325/420, 325/423
[51] Int. Cl. ........................................... H04b 1/16
[58] Field of Search ............ 325/17, 332, 333, 335, 325/344–347, 349, 433, 418–423, 436, 437, 444; 329/122, 124, 136; 343;7 A

[56] References Cited
UNITED STATES PATENTS
3,160,815  12/1964  Ford et al. ......................... 325/346

*Primary Examiner*—Albert J. Mayer
*Attorney, Agent, or Firm*—Edward J. Norton; George J. Seligsohn

[57] ABSTRACT

A doppler tracker suitable for use as an airborne receiver in a doppler scan microwave landing system. The tracker derives a tracking error signal for a phase-locked VCO which employs a phase-locked loop. The phase-locked loop derives a signal which is proportional to instantaneous frequency error, except during phase discontinuities which occur only momentarily at the end of a scan. By applying this derived signal as an input to an integrator through a normally open gate that is maintained closed during the occurrence of phase discontinuities, the output of the integrator manifests the tracking error signal.

8 Claims, 4 Drawing Figures

MICROWAVE LANDING SYSTEM

DOPPLER TRACKER TRANSMITTER

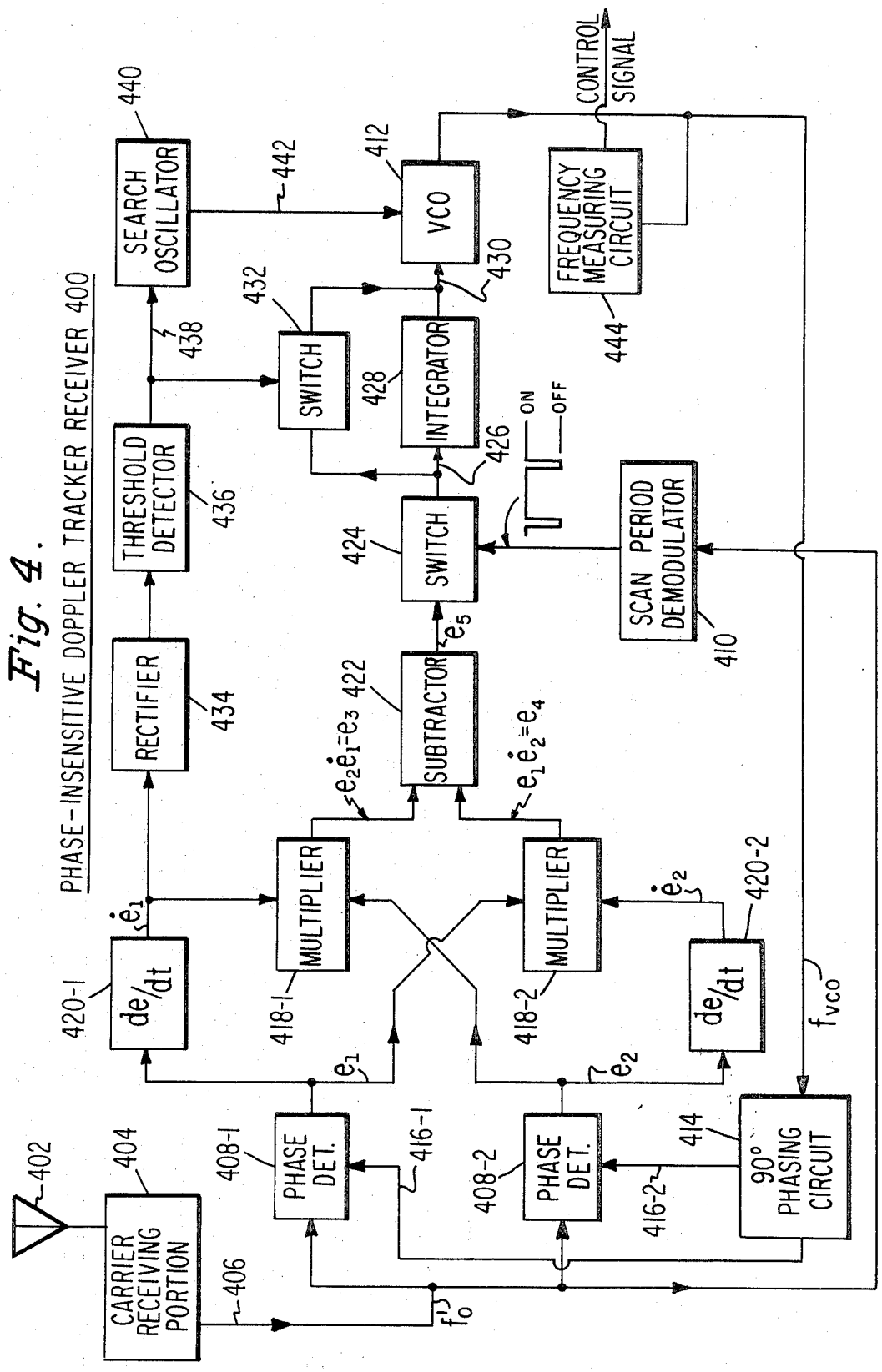
Fig. 4. PHASE-INSENSITIVE DOPPLER TRACKER RECEIVER 400

3,800,231

DOPPLER TRACKER RECEIVER

This invention relates to doppler tracker receivers and, more particularly, to a relatively phase-insensitive doppler tracker receiver suitable for use as an airborne direction finder in a microwave landing system for aircraft.

So-called "pseudodoppler" antenna arrays have been developed for transmitting a radio signal having a frequency which is a function of the angular orientation of any ray thereof with respect to a reference direction. Such a "pseudodoppler" antenna array normally comprises a linear array of a predetermined plural number of equally spaced elements. Commutating switch means are effective in periodically applying a signal of a given frequency from a transmitter to each of these elements in order. This results in a cyclic scan of the elements of the linear array in order from the first element thereof to the last element thereof, with a flyback from the last element thereof to the first element thereof between successive forward scans.

During each forward scan, due to the doppler effect, the frequency of any ray transmitted from the linear array will differ from the applied transmitter signal frequency by an amount which is a function of the length of the linear array, the scanning rate and the angle of that transmitted ray with respect to the normal to the linear array. Since the transmitter signal frequency, the scanning rate and the length of the linear array have known, fixed values, such a "pseudodoppler" antenna array is capable of being employed as part of a direction-finding system which permits remote airborne doppler tracker receiver to determine its angular orientation with respect to the reference direction of the linear pseudodoppler antenna array from the frequency which exists during each forward scan of the transmitted ray received by the remote airborne doppler tracker receiver.

However, during flyback between successive forward scans, an unwanted phase discontinuity or jump takes place. The effect of the phase discontinuity is to make the average frequency change in steps of 1/T, where T is the scan period. This adds an unwanted "granularity" to the received frequency, which adversely affects the degree of precision with which direction can be determined.

The present invention is directed to an improved, relatively phase-insensitive, doppler tracker receiver which, although not limited thereto, is useful in overcoming the problem of "granularity" and permits a more precise determination of direction from a signal transmitted from a "pseudodoppler" antenna array than otherwise would be the case.

This and other features and advantages of the present invention will become apparent from the following detailed description taken together with the accompanying drawing, in which FIG. 1 is a block diagram of a proposed microwave landing system;

FIG. 4 is a block diagram of a phase-insensitive doppler tracker receiver embodying the present invention.

Figure 1:
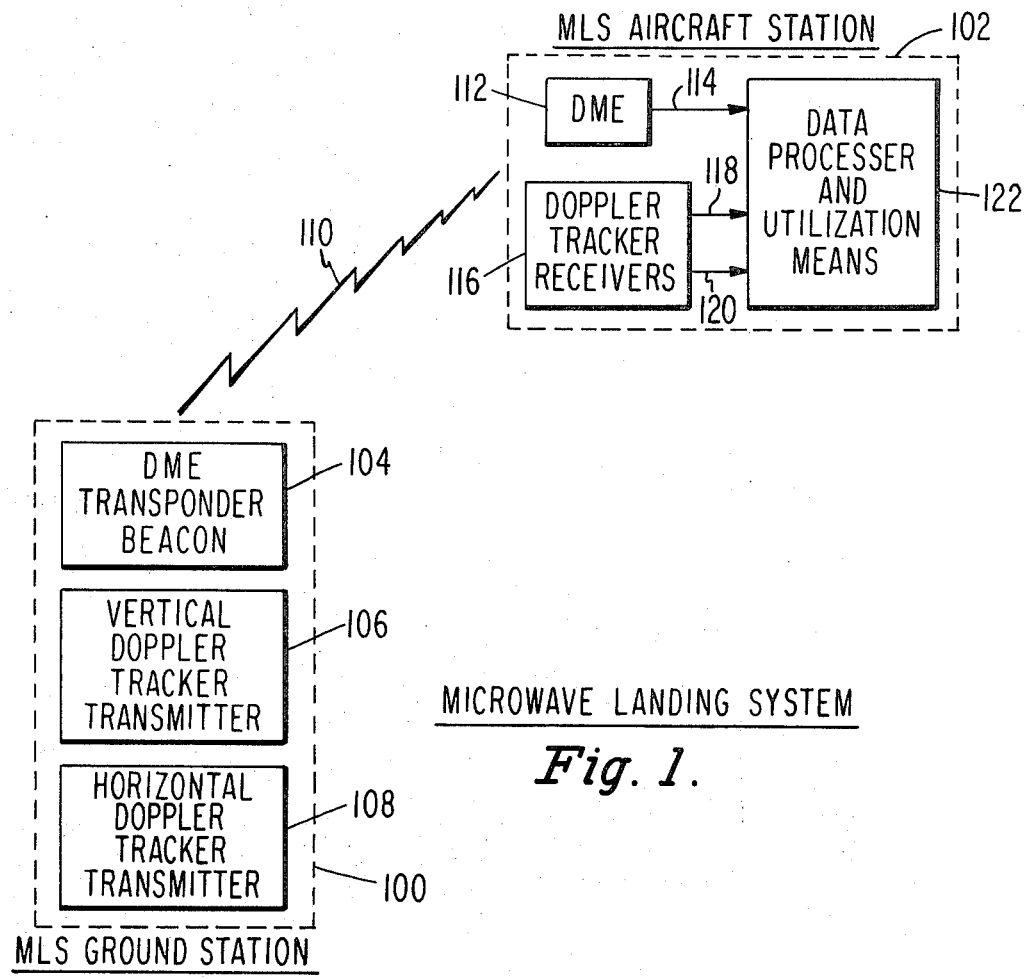

Referring now to FIG. 1, there is shown a ground station 100, associated with a particular runway of an airport, and an aircraft station 102, aboard a remote aircraft, which intends to land on this particular runway. Ground station 100 includes a DME (distance measuring equipment) transponder beacon 104, vertical doppler tracker transmitter 106 and horizontal doppler tracker transmitter 108. As indicated by line 110, the equipment included in ground station 100 is in radio contact with cooperating equipment of aircraft station 102 aboard the remote aircraft. In particular, DME 112 cooperates in a known manner with DME transponder beacon 104 to provide an output 114 from DME 112 having a value which continuously manifests the then-existing distance between the remote aircraft incorporating aircraft station 102 and the runway associated with ground station 100. Doppler tracker receivers 116 include a vertical receiver portion which cooperates with vertical doppler tracker transmitter 106 to provide an output 118, which has a value which continuously manifests the then-existing elevation angle between the aircraft incorporating aircraft station 102 and the runway with which ground station 100 is associated. Doppler tracker receivers 116 further includes a horizontal receiver portion cooperating with horizontal doppler tracker transmitter 108 to provide an output 120, which has a value which manifests the then-existing azimuth of the aircraft incorporating aircraft station 102 with respect to a reference direction parallel to the length of the runway with which ground station 100 is associated.

Outputs 114, 118 and 120 are coupled as information inputs to data processor and utilization means 122 of aircraft station 102. Data processor and utilization means 122 includes a computer responsive to the applied distance, elevation and azimuth information to continuously compute the then-existing position of the aircraft with respect to the runway associated with ground station 100. Further, data processor utilization means includes means responsive to both this derived position information and glide-path information, which has been preprogrammed therein, to either instruct the pilot of the aircraft in real time how to control the aircraft to properly land it on the particular runway which ground station is associated or, in the alternative, to automatically land the aircraft on this particular runway. Since the microwave landing system, itself, is not part of the present invention, it will not be discussed herein in any further detail.

Figure 2:
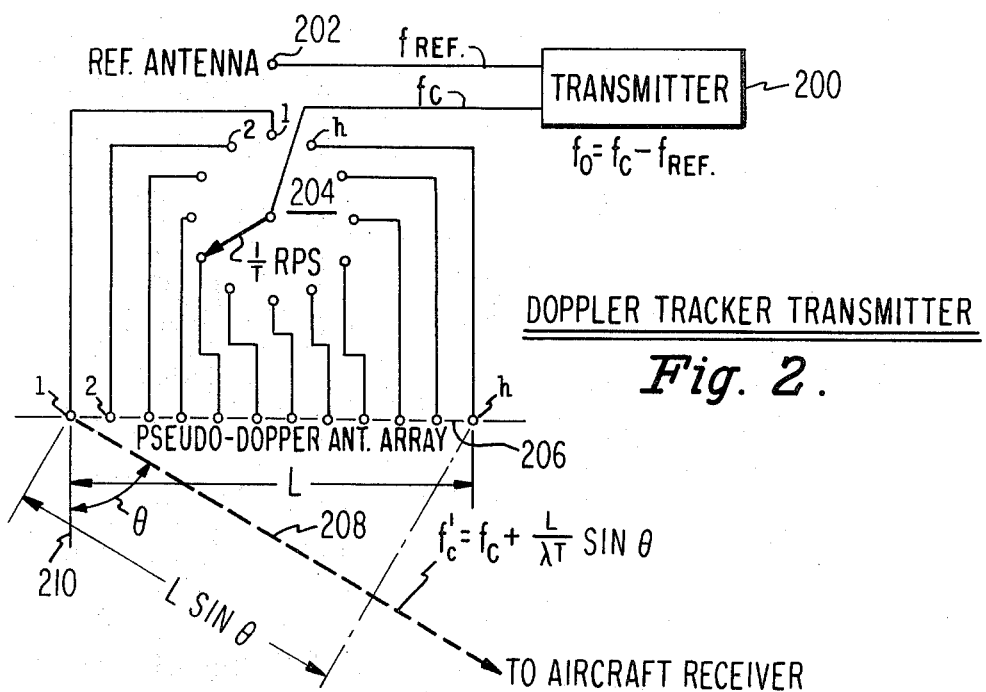
FIG. 2 is a schematic diagram of a doppler tracker transmitter of the microwave landing system shown in FIG. 1.

FIG. 2 shows a doppler tracker transmitter, incorporating a pseudodoppler antenna array, which may be employed as either vertical doppler tracker transmitter 106 or horizontal doppler tracker transmitter 108. The only important differences between transmitters 106 and 108 is that the pseudodoppler antenna array of vertical tracker transmitter 106 is oriented vertically, while the psuedodoppler antenna array of horizontal doppler tracker transmitter 108 is oriented horizontally in a direction normal to the length of the particular runway with which horizontal doppler tracker transmitter 108 is associated and that the specific preselected values of operating parameters, such as wavelength, are different from each other.

The doppler tracker transmitter in FIG. 2 includes transmitter 200, which generates a reference-antenna signal at a first predetermined frequency $f_{REF}$ and a pseudodopler antenna array signal at a predetermined carrier frequency $f_c$. As indicated in FIG. 2, the frequency $f_c$ and $f_{REF}$ differ from each other by a predetermined off-set frequency $f_o$.

As shown, the reference-antenna signal $f_{REF}$ is applied directly as an input to reference antenna 202. Carrier-frequency signal $f_c$ is applied by commutating switch 204 in sequence to each of linearly disposed, equi-spaced, diven elements 1, 2 ... n of pseudodopler antenna array 206. As shown in FIG. 2, the overall length of pseudodoppler antenna array 206, which extends from left-end element 1 thereof to right-end element n thereof, is L. Further, as indicated in FIG. 2, the wiper of commutating switch 204 rotates in a counter-clockwise direction at rate of 1/T revolutions-per-second, where T is the period in seconds of one revolution. Therefore, during each cycle of commutating switch 204, as the wiper thereof sequentially moves through contact 1, 2 ... n thereof, pseudodoppler antenna array 206 scans in a forward direction from driven element 1 thereof towards driven element n thereof. However, as the wiper of commutating switch 204 moves in a counter-clockwise direction from contact n thereof to contact 1 thereof, flyback occurs. This flyback happens in a short time interval between successive forward scans of pseudodoppler antenna array 206.

As indicated in FIG. 2, the actual frequency of $f_c'$ of a transmitted ray 208 directed to a remote aircraft receiver from pseudodoppler antenna array 206 during a forward scan thereof depends upon the angle $\theta$ between ray 208 and the normal 210 to pseudodoppler array 206 in accordance with the following equation:

$$f_c' = f_c + (L/\lambda T) \sin\theta; \quad (1)$$

where $f_c$ is the carrier frequency of the signal from transmitter 200 applied to pseudodoppler array 206, L is the overall length of pseudodoppler antenna array 206, $\lambda$ is the radiated wavelength in space corresponding to carrier frequency $f_c$, and T is the scan period of pseudodoppler antenna array 206.

The specific values of $f_{REF}$ and $f_c$ emloyed in the vertical doppler tracker transmitter are different from those employed in the horizontal doppler tracker transmitter. In addition, the selected values of T and L may be different for the vertical and horizontal doppler tracker transmitters, respectively. Further, transmitter 200 may modulate the signal $f_c$ and/or the signal $f_{REF}$ with a modulating signal which is synchronized with the rotation of commutating switch 204 in order to indicate the end of a forward scan and thereby the occurrence of a flyback at the end of each forward scan. However, such a modulating signal, although desirable, is not essential to the present invention.

Although each doppler tracker transmitter transmits to the aircraft receiver a pair of signals having respective frequencies corresponding to $f_{REF}$ and $f_c'$ shown in FIG. 2 and discussed above, the remote aircraft receiver does not receive signals having these transmitted frequencies, but frequencies which have been shifted therefrom. This results from the relative motion between the remote aircraft incorporating the doppler tracker receivers and the ground station incorporating the doppler tracker transmitters causing an unwanted actual doppler shift in both the signal from reference antenna 202 and the signal from pseudodoppler antenna array 206. However, since this unwanted actual doppler shift is the same for both the transmitted reference antenna signal and the transmitted pseudodoppler antenna-array signal, it can be cancelled by subtracting the two received signals in the doppler tracker receiver to obtain a received off-set frequency $f_o'$ which is equal to the difference between $f_c'$ (defined by equation (1)) and $f_{REF}$. If, as shown in FIG. 2, $f_0$ equals $f_c - f_{REF}$, then:

$$f_o' = f_0 + L/(\lambda T) \sin\theta \quad (2)$$

Thus, the purpose of transmitting a reference frequency signal $f_{REF}$, along with the signal from pseudodoppler antenna array 206, is to eliminate at the remote receiver any actual doppler frequency shift due to the relative velocity of the remote aircraft with respect to the ground station. Since the values $f_0$, L, $\lambda$ and T are all known constants, the derived value of $f_o'$ at the receiver is a measure of the angle $\theta$.

Figure 3:
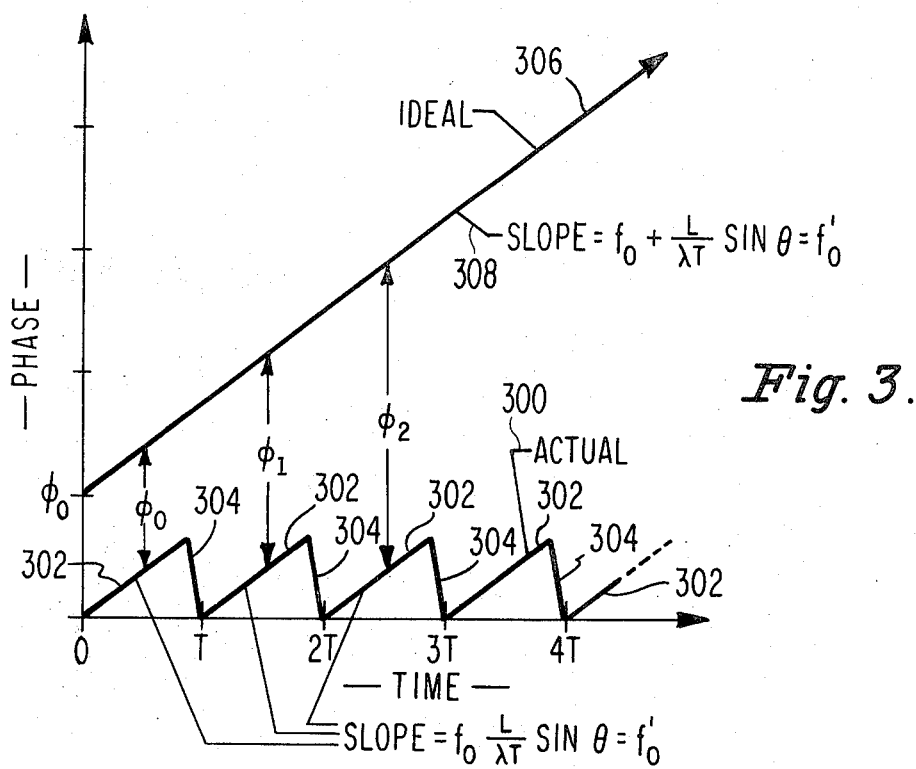
FIG. 3 is a graph helpful in explaining the problem with which the present invention is concerned.

As is known, frequency is proportional to the rate of change of phase with respect to time. FIG. 3 is a graph of phase with respect to time for both the actual received off-set frequency and an ideal off-set frequency which would exist if the transmitting pseudodoppler antenna array were of infinite length and, therefore, not subect to flyback between successive forward scans. In particular, actual graph 300 comprises a periodic sawtooth wave having a period equal to T. Each wavelength of the sawtooth wave includes a relatively long positively sloped linear portion 302, corresponding to the forward scan of the transmitting pseudodoppler antenna array, and a relatively short flyback portion 304. The positively sloped linear portion 302 has value equal to $f_o'$, as indicated in FIG. 3. The ideal graph 306 defines a single linear function having a slope 308 also equal to $f_o'$. The Y-intercept phase of ideal graph 306 is $\phi_0$.

Thus, all the positively sloped portions 302 of actual graph 300 are parallel to each other and are also parallel to slope 308 of ideal graph 306. However, the phase difference between ideal graph 306 and actual graph 300 is not constant, but changes during each flyback period 304 of actual graph 300. As idicated in FIG. 3, the phase difference between ideal graph 306 and the positively sloped portion 302 of each of the first three cycles $T_1$, $T_2$ and $T_3$ of actual graph 300 is $\phi_0$, $\phi_1$, and $\phi_2$, respectively. It is this change in phase which occurs during each flyback which causes the unwanted "granularity" in the off-set frequency derived at the doppler tracker receiver.

FIG. 4 is a block diagram of a doppler tracker receiver embodying the present invention, which is capable of deriving a signal from a voltage-controlled oscillator (VCO) approaching the form of ideal graph 306 from a received signal having the form of actual graph 300. This VCO signal, in which "granularity" is reduced to a negligible level, is capable of providing a more precise measure of the value of the angle of $\theta$ than could be obtained in the presence of "granularity."

As shown in FIG. 4, airborne phase-sensitive doppler tracker receiver 400 comprises conventional antenna 402 and carrier receiving portion 404 for deriving a signal having off-set frequency $f_o'$ on output conductor 406 of carrier receiving portion 404. Carrier receiving portion 404 may include respective RF amplifiers, frequency converters and/or IF amplifiers responsive to received signals corresponding to $f_c'$ and $f_{REF}$ transmitted from the ground station. In any case, carrier receiving station 404 includes a mixer for mixing these two received signals to provide the difference off-set frequency $f_o'$ as the output signal on conductor 406.

This off-set frequency signal $f_o'$ on conductor 406 is applied as respective first inputs to phase detector 408-1 and phase detector 408-2. In addition, the off-set frequency signal $f_o'$ on conductor 406 is applied as an input to scan period demodulator 410. Demodulator 410 detects either a modulation component of $f_o'$ due to modulation of $f_{REF}$ and/or $f_c$ at the transmitter or detects the phase discontinuity which occurs during flyback, to determine the beginning and end of each scan period.

The output signal of VCO (voltage-controlled oscillator) 412, which has a frequency $f_{VCO}$, is applied as an input to 90° phasing circuit 414. Circuit 414 derives two output signals, each having a frequency $f_{VCO}$, which are in phase quadrature with respect to each other. A first of these phase-quadrature signals is applied at the second input to phase detector 408-1 over conductor 416-1 and the second of these phase-quadrature signals is applied as a second input to phase detector 408-2 over conductor 416-2. The output of phase detector 408-1, a signal $e_1$, is applied as a first input to multiplier 418-2 and also as an input to differentiating circuit 420-1. The output of phase detector 408-2, a signal $e_2$, is applied as a first input to multiplier 418-1, and also as an input to differentiating circuit 420-2. The output $\dot{e}_1$ of differentiating circuit 420-1 is applied as a second input to multiplier 418-1. The output $\dot{e}_2$ of differentiating circuit 420-2 is applied as a second input to multiplier 418-2.

The output $e_3$ of multiplier 418-1, which has a value $e_2\dot{e}_1$, is applied as a first input to subtractor 422 and the output $e_4$ of multiplier 418-2, which has a value $e_1\dot{e}_2$ is applied as a second input to subtractor 422. The output $e_5$ from subtractor 422 is applied as an input to a switch (gate) 424. A control signal from the output of scan period demodulator 410 is applied to switch 424 to pass signal $e_5$ therethrough during the forward scan of each scan period and prevent the passage of signal $e_5$ therethrough during the flyback portion of each scan period. The output from switch 424, appearing on conductor 426, is applied as an input to integrating circuit 428. Any integrated signal appearing at the output of integrating circuit 428 on conductor 430 is applied as a first control signal to VCO 412.

As shown, integrator 428 is shunted by a switch (gate) 432 which, in a first condition thereof (with switch 432 closed) short-circuits integrator 428 (so that the signal from switch 424 is passed directly as a first control signal to VCO 412 without being integrated) and in a second condition thereof (with switch 432 open) permits integrator 428 to integrate the signal from switch 424 before it is applied as a control voltage for VCO 412 on conductor 430.

The output $\dot{e}_1$ from differentiating circuit 420-1, besides being applied as an input to multiplier 418-1, is also rectified by rectifier 434 and applied as an input to threshold detector 436. If the amplitude of the output from rectifier 434 is sufficiently high, threshold detector 436 will produce an enabling signal on conductor 438, which is applied to both switch 432 and search oscillator 440. In response to this enabling signal, switch 432 is closed, to thereby shunt integrator 428 and apply the voltage from switch 424 directly on conductor 430 without integration for controlling VCO 412, and search oscillator 440 is enabled. When enabled, search oscillator 440 applies a periodically varying voltage over conductor 442 as a second control voltage to VCO 412.

The output of VCO 412, besides being fed back as an input to 90° phasing circuit 414, is applied to a frequency-measuring circuit 444 to derive a control signal output which may be used to indicate deviation from the desired course or to control the aircraft so as to make it follow the desired course. Frequency-measuring circuit 444 may be one of several types known to the art such as a gated digital counter, a pulse integrator, or a selective-circuit discriminator. The type employed will depend upon the application. In considering the operation of receiver 400, it will first be assumed that the frequency $f_{VCO}$ of VCO 412 differs from the frequency $f_o'$ by a relatively fall amount. Under such a condition, the rate at which the relative phase of the frequencies $f_o'$ and $f_{VCO}$ change with respect to each other is small. Therefore, both $e_1$ and $e_2$ will be signals of relatively small amplitude. In particular, the amplitude of $\dot{e}_1$ will not be sufficiently high so that, after rectification by rectifier 434, it will overcome the threshold of detector 436. Switch 432 and search oscillator 440 are then not enabled. This may be called the tracking mode of the receiver.

Under this condition the respective normalized outputs $e_1$ and $e_2$ of phase detectors 408-1 and 408-2 are given by the following equations:

$$e_1 = \cos[2\pi(f_{VCO} - f_o')t + \phi(t)] \tag{3}$$

$$e_2 = \sin[2\pi(f_{VCO} - f_o')t + \phi(t)] \tag{4}$$

where $\phi(t)$ is the phase difference between $f_{VCO}$ and $f_o'$.

Therefore, the respective normalized outputs $\dot{e}_1$ and $\dot{e}_2$ from differentiating circuits 420-1 and 420-2 are given by the following equations:

$$\dot{e}_1 = -[2\pi(f_{VCO} - f_o') + \dot{\phi}(t)]\sin[2\pi(f_{VCO} - f_o')t + \phi(t)] \tag{5}$$

$$\dot{e}_2 = [2\pi(f_{VCO} - f_o') + \dot{\phi}(t)]\cos[2\pi(f_{VCO} - f_o')t + \phi(t)] \tag{6}$$

Thus, the respective normalized outputs $e_3$ and $e_4$ at the outputs of multiplier 418-1 and 418-2 are given by the following equations:

$$e_3 = e_1\dot{e}_2 = [2\pi(f_{VCO} - f_o') + \dot{\phi}(t)]\cos^2[2\pi(f_{VCO} - f_o')t + \phi(t)] \tag{7}$$

$$e_4 = e_2\dot{e}_1 = -[2\pi(f_{VCO} - f_o') + \dot{\phi}(t)]\sin^2[2\pi(f_{VCO} - f_o')t + \phi(t)] \tag{8}$$

However, since the sum of the square of the sine of an angle and the square of the cosine of that angle is always equal to unity, when $e_4$ is subtracted from $e_3$ by subtractor 422, the subtractor output $e_5$ is given by the following equation:

$$e_5 = e_3 - e_4 = 2\pi(f_{VCO}-f_o') + \dot{\phi}(t) \quad (9)$$

As shown in FIG. 3, during each forward scan, the phase difference is constant. Therefore, during each forward scan, $\dot{\phi}(t)$, the rate of change of phase difference, is zero. Thus, during each forward scan, the value of $e_5$, given by equation (9), reduces to $2\pi(f_{VCO}-f_o')$ i.e. during each forward scan the value of $e_5$ is proportional to the error in the VCO output frequency with respect to the received off-set frequency.

Also, as shown in FIG. 3, the value of $\dot{\phi}(t)$ is not zero during the flyback period between succsive scans at the peaks of the sawtooth wave. However, the presence of scan period demodulator 410 and switch 424 allows $e_5$ to be passed to the input of integrator 428 only during the forward scan portions of each scan period. During the flyback portion of each scan period, switch 424 is maintained open by scan period demodulator 410, so that the input circuit of integrator 4 is open-circuited during flyback and the integrator output retains the value which existed at the end of the scan period. The output from integrator 428, which is applied as the control voltage to VCO 412, is proportional to only the integral with respect to time of $2\pi(f_{VCO}-f_o')$; i.e. to the accumulated phase error between $f_{VCO}$ and $f_o'$. This control voltage, acting as a servo control, shifts the value of $f_{VCO}$ in that direction which minimizes the accumulated phase error manifested by the output of integrator 428. In this manner, the frequency of the continuous output signal from VCO (whose phase graph looks like ideal graph 306 in FIG. 3) is made substantially equal to the forward scan portion of the received off-set frequency (whose phase graph looks like actual graph 300 of FIG. 3).

In principle, the circuit described above will operate for any value of the frequency difference between $f_{VCO}$ and $f_o'$. But the accuracy with which the VCO is set to the rate of change of phase of the transmitted signal during the forward scan may be a few Hz, and the initial difference between $f_{VCO}$ and $f_o'$ and be 10 KHz or more. It is impractical to provide a differentiator which will operate over such a wide range. A differentiator operating from 4 Hz to 40 KHz would have a loss of 90 dB at 4 Hz compared to 40 KHz.

To allow operation with a limited differentiator range is the purpose of rectifier 434, threshold detector 436, switch 432 and search oscillator 440. If the difference between $f_{VCO}$ and $f_o'$ approaches the upper frequency limit of differentiators 420-1 and 420-2, the amplitude of $\dot{e}_1$ will be high enough so that, after rectification, it overcomes the threshold of detector 436. Switch 432 and search oscillator 440 will then be enabled. In response to this enabling signal, the output voltage from search oscillator will vary in level over a given range, resulting in frequency $f_{VCO}$ of VCO 412 varying over a range which includes frequency $f_o'$. However, as soon as the difference between $f_{VCO}$ and $f_o'$ becomes small enough to be within the range of differentiators 420-1 and 420-2 an error signal $e_5$ is developed which passes through switches 424 and 432 and, overcoming the search oscillator voltage, brings the VCO frequency very close to $f_o'$. At the same time $\dot{e}_1$ becomes too small to overcome the threshold of detector 436, the output of this detector decays to zero, and the enabling voltage on conductor 438 is removed. This disables search oscillator 430 and at the same time opens switch 432 so that integrator 438 is no longer shunted.

The mode of operation when search oscillator 440 is enabled and switch 432 is closed may be called the search mode of the receiver. Itormally occurs only as the airaft enters coverage range of the microwave landing system.

Although the phase-insensitive tracker receiver 400 of the present invention has been described for particular use with a pseudodoppler transmitter of a microwave landing system, it is useful in any other system employing discontinuous signals, whether scanning is in one direction or bidirectional. One such other system for instance, is an FM radar altimeter employing sawtooth or isosceles triangle waves.

Further, with switch 424 eliminated so that signal $e_5$ is applied directly to the input of integrator 428, receiver 402 is useful for an input signal exhibiting continuous phase modulation that cannot be gated out, provided that the sidebands of the phase modulation fall within the frequency range of the differentiators and the average value of the rate of change of phase is zero. In this mode of operation, receiver 400 could be used to provide AFC for the carrier frequency of a phase-shift-modulated data transmission system or to track the center frequency of the doppler spectrum in an airborne doppler navigator system.

What is claimed is:

1. A doppler receiver for receiving a doppler signal, said receiver comprising:
   a. a voltage-controlled oscillator for producing a controlled frequency,
   b. phase detection means coupled to said oscillator and responsive to said doppler signal applied thereto for deriving first and second outputs manifesting respectively the difference in phase between each of first and second phase-quadrature components of said controlled frequency and said signal,
   c. signal-processing means responsive to said first and second outputs of phase detection means for deriving output therefrom substantially proportional to the difference which exists when the product of one of said first and second outputs and the first derivative of the other of said first and second outputs is subtracted from the product of said other of said first and second outputs and the first derivative of said one of said first and second outputs.
   d. an integrator, and
   e. sampling means for applying the output from said signal-processing means as an input to said integrator, the output from said integrator being fed back as a control input to said voltage-controlled oscillator to shift the controlled frequency thereof in a direction to reduce the error between the controlled frequency thereof and the frequency of said doppler signal.

2. The doppler receiver defined in claim 1, wherein said doppler signal includes phase shifts which average to substantially zero.

3. The doppler receiver defined in claim 1, wherein said doppler signal at the end of each one of successively occurring intervals exhibits a phase discontinuity, such phase dicontinuities being cumulative from one interval to the next, and wherein said coupling means includes a switch normally enabled for applying said output signal from said signal processing means as the input to said integrator and switch-control means having said doppler signal applied thereto for disabling said switch during the occurrence of a phase disntinuity.

4. The doppler receiver defined in claim 3, wherein said doppler signal constitutes a periodic scan signal in which the length of each interval is equal to a scan period and said phase discontinuity occurs during flyback at the end of each scan period, and wherein said switch-control means includes a scan-period demodulator.

5. The receiver defined in claim 4, wherein said doppler signal includes an amplitude-modulation manifesting the phase and frequency of said scan signal, and wherein said scan period demodulator is responsive to said amplitude modulation.

6. The receiver defined in claim 4, wherein said doppler signal includes a phase-modulation manifesting the phase and frequency of said scan signal, and wherein said scan-period demodulator is responsive to said phase modulation.

7. The receiver defined in claim 1, wherein said signal processing means includes a first differentiator for differentiating said first output of said phase detection means, a second differentiator for differentiating said second output of said phase detection means, a first multiplier for multiplying the output of said first differentiator and the second output of said phase detection means, a second multiplier for multiplying the output of said second differentiator and the first output of said phase detection means, and a subtractor for subtracting the output of said first multiplier from the output of said second multiplier.

8. The receiver defined in claim 6, further including a normally disabled second switch shunting said integrator, a normally disabled search oscillator effective when enabled for controlling the frequency of said voltage-controlled oscillator, a threshold detector having its output coupled as a control input to both said second switch and said search oscillator for effecting the enabling thereof only in response to the magnitude of the input to said threshold detector having at least a predetermined value, and means for rectifying the output of one of said differentiators and applying the rectified output as the input to said threshold detector.

* * * * *

UNITED STATES PATENT OFFICE
CERTIFICATE OF CORRECTION

Patent No. 3,800,231      Dated March 26, 1974

Inventor(s) John Harry Pratt

It is certified that error appears in the above-identified patent and that said Letters Patent are hereby corrected as shown below:

Column 3, line 9,   "diven" should read --driven--

Column 6, line 44, "$e_1$" should read --$\dot{e}_1$--

Column 6, line 58, "$e_1e_2$" should read --$e_1\dot{e}_2$--

Column 7, line 16, "$\phi(t)$" should read --$\dot{\phi}(t)$--

Column 7, line 17, "succsive" should read --successive--

Column 7, line 25, "4" should read --428--

Column 7, line 46, "and be" should read --may be--

Column 8, line 5, "438" should read --428--

Column 8, line 8, "Itormally" should read --It normally--

Column 8, line 9, "airaft" should read --aircraft--

Column 9, line 5, "disn-" should read --discon- --

Signed and sealed this 10th day of September 1974.

(SEAL)
Attest:

McCOY M. GIBSON, JR.      C. MARSHALL DANN
Attesting Officer      Commissioner of Patents